Patented Sept. 14, 1943

2,329,589

UNITED STATES PATENT OFFICE 2,329,589

CERAMIC CEMENT

Willard K. Carter, Columbus, Ohio, assignor to National Aluminate Corporation, Chicago, Ill., a corporation of Delaware No Drawing. Application March 10, 1941, Serial No. 382,585

13 Claims. (Cl. 106—55)

The present invention relates to improvements in ceramic cements, by which term it is intended to include ceramic products such as fired articles made from siliceous raw materials such as siliceous refractories, refractory clay products such as fire clay, firebrick and the like, ordinary argillaceous clay products, fired specialties such as talc and steatite bodies, as well as the self-hardening cements such as are exemplified by Portland cement and its equivalents.

More particularly, the present invention relates to the employment of a special type of reagent to assist in the bonding of ceramic ware, using the term in the above connotation, which material consists of a colloidal aqueous solution of silica, $SiO_2$, which is of a high degree of purity and contains very little material other than $SiO_2$ and water, and in which event the ratio of $SiO_2$ to $Na_2O$ is at least 10:1.

One of the objects of the invention therefore is to improve the manufacture of fired ceramic ware and unfired self-hardening cements by incorporating therewith, during some stage of their fabrication, quantities of a colloidal silica solution which greatly enhances the strength of the products and also endows them with other highly desirable properties. The colloidal silica solution used for the present purpose is one which is prepared by treating a diluted solution of an alkali silicate with a carbonaceous base-exchange material which abstracts the alkali metal ions therefrom, leaving the silica in stable colloidal solution. So much of the alkali metal salts are removed from the silicate solution that the ratio of $SiO_2$ to $Na_2O$ may be even as high as 50:1. Despite the fact that there is so little sodium salt left, the solution is quite stable and may be kept for a number of years even though it have a concentration of as much as 15% solids. The solution is a clear liquid having many remarkable properties which are particularly adapted to the purposes of the present invention. For more details relative to this colloidal silica solution, reference is directed to the application of Paul G. Bird, Serial No. 329,729, filed April 15, 1940, now matured into United States Patent No. 2,244,325, of June 3, 1941. This colloidal silica solution is now on the market as a commercial product, and for the sake of simplicity and in order definitely to designate the product utilized, I have coined therefor the fanciful name "Colosil," by which I mean the product of the said Bird application and patent. This "Colosil" is very slightly alkaline reacting, but may be neutralized to phenolphthalein neutrality by means of a suitable acid without causing flocculation or precipitation of the therein contained silica. It may also be that the silica is really in the form of its hydrate, such for example as $Si(OH)_4$. It should be thoroughly understood that the Colosil is entirely dissimilar to any previously known type of colloidal silica solution and is in nowise to be confused with dilute solutions of alkali silicates or even the so-called neutralized alkali silicates, because these invariably will contain the ions resulting from the neutralizing agents and also will still contain, in undiminished amount, the alkali metal, such as the sodium which was originally combined with silicic acid in the form of silicate. Such solutions of silicates possess altogether different properties from those of the Colosil and could not be substituted therefor.

I have discovered that by the use of the Colosil it is possible to prepare materials which are of great benefit in a number of ceramic processes. These new materials or ceramic cements, as they might be called, may truly be considered as constituting a novel form of chemical compound. It will be obvious from the numerous examples given hereinbelow that the materials cannot be considered as true silicates, but at the same time it is evident that there is some combination of silica which catalyzes or in some other way greatly accelerates the normal action of certain chemicals used in the ceramic arts. It hence follows that the materials treated with Colosil are in some way altered so as to become endowed with unique chemical properties.

In ceramic processes such as those which involve the use of highly siliceous materials the bonding is usually effected at least in part by the fluxing of silica from the ceramic body and the subsequent crystallization of such fluxed silica in the form of a mineral or mineral combination which is advantageous with respect to the ultimate properties of the product. I have been able to obtain direct and conclusive evidence that ceramic raw materials treated with Colosil react entirely differently than the untreated materials and that such a difference in reaction is not due to a simple enrichment of the body of the silica. This can be demonstrated conclusively by the use of, for example, calcium hydroxide or barium aluminate, which either have been used conjointly with or previously treated with Colosil. Thus, I have among my examples ceramic bodies containing initially nearly 100% silica available for reaction with, for example, calcium hydroxide, which behave quite differently if the calcium hydroxide be used conjointly with the Colosil, which could not be accounted for by the slight increase in silica content.

I have found it quite impossible to theorize about the new compounds or to determine their actual forms either as they exist when first mixed with the ceramic raw materials or as they exist in the finished product, but for the sake of convenience I will term these new materials which have been treated with Colosil as the "silicized" form of the corresponding chemical, and I will call the process "silicafication." Hereinbelow I will describe the action of the following compounds: silicized calcium hydroxide, silicized barium aluminate, silicized sodium aluminate, silicized calcium carbonate, silicized hydraulic cement, silicized talc, and silicized magnesium salts.

The silicafication may be carried out in any manner most convenient to the particular process involved, the important essential being to effect sufficient contact of the Colosil with the chemical which is to be silicized. This may involve the prior admixture of the Colosil with the chemical to be treated, followed by the subsequent introduction of the newly formed silicized compound into a suitable ceramic batch or it may be accomplished satisfactorily by, for example, mixing Colosil with a ceramic batch already containing the material which it is desired to silicize. The following examples give the detailed steps which I have used to accomplish the desired results in a number of processes.

EXAMPLE 1

SILICA REFRACTORIES

In order to establish the differences between my present invention and the prior art, I will now give examples in the case of silica refractories which have been made with the normal or hitherto used bonding materials as compared with silicized chemicals. The procedure of manufacture was in all cases the same. For example, lump ganister, which contains about 99% $SiO_2$, was charged into a wet pan type of mixer and grinder, wherein the silicized chemicals or the Colosil and chemicals to be silicized were added and the mixture ground until the ganister was reduced to a size permitting hard molding of the mixture. The granule size for this purpose is well known in the art of manufacturing ganister refractories, and the sizes may be, for example, those shown in McKinley and Carter Patent No. 2,017,723. The mix in each case was made by hammering into metal molds, the molds then being removed, dried at approximately 250° F., and eventually fired in suitable kilns to cone 20 (Orton). It must be realized that the chemicals added to this essentially all silica body would have a maximum opportunity for reaction with silica during normal heat treatment, and hence the Colosil cannot be considered as appreciably enriching the body in silica. It can be assumed that any difference in reaction brought about by addition of the Colosil must result from the actual alteration of the characteristics of the chemical addition and that this alteration is induced by the combination of the material with Colosil, which combination I choose to term silicafication.

Therefore, in order to demonstrate from this point of view the advantage of the use of Colosil, I have had prepared four different batches of highly siliceous refractory based upon ganister and a suitable bonding agent such as either barium aluminate or lime, making comparable batches both with and without the Colosil. The batches had the following composition:

Batch 1

| | Pounds |
|---|---|
| Ganister | 1300 |
| $3BaO.Al_2O_3$ | 26 |
| Water | 145 |

Batch 2

| | Pounds |
|---|---|
| Ganister | 1300 |
| $3BaO.Al_2O_3$ | 26 |
| Colosil | 104 |
|   $SiO_2$ pounds | 6.24 |
|   $Na_2CO_3$ do | .208 |
|   $H_2O$ do | 97.56 |
| Water | 49 |

Batch 3

| | Pounds |
|---|---|
| Ganister | 1300 |
| Hydrated lime | 18 |
| Colosil | 78 |
|   $SiO_2$ pounds | 4.48 |
|   $Na_2CO_3$ do | 0.156 |
|   $H_2O$ do | 73.36 |
| Water | 78 |

Batch 4

| | Pounds |
|---|---|
| Ganister | 1300 |
| Hydated lime | 36 |
| Water | 150 |

No attempt was made to process a mix similar to Batch 3 containing only 1% of lime without the Colosil addition, because previous commercial experience had demonstrated that it is impossible to obtain ware good enough for testing with so small an addition of lime. It should be particularly noticed that the Colosil additions used are in the range where silica additions thus supplied cannot result in mixtures comparable in ultimate analysis to any known natural or available silicates of the chemicals concerned.

In the present set of examples the silicafication was accomplished by mixing the chemical additions (such as the barium aluminate or hydrated lime) with the Colosil prior to the addition thereof to the ganister batch.

In the above set of batches, Batch 4 corresponds to an example of well-known prior regular commercial practice, and it is included in order to determine how closely the properties of a mixture containing only 1% of silicized lime would compare with normal practice using 2% of ordinary lime.

The physical properties of the products obtained are illustrated in Table I hereinbelow:

Table I

PHYSICAL PROPERTIES—STANDARD TESTS

| | Batch 1, Barium aluminate | Batch 2, Silicized barium aluminate | Batch 3, Silicized lime hydrate, 1% | Batch 4, Ordinary lime hydrate, 2% |
|---|---|---|---|---|
| Percent porosity | 31.7 | 30.7 | 27.4 | 27.0 |
| App. sp. gr. | 2.31 | 2.30 | 2.30 | 2.30 |
| Blk. density | 1.58 | 1.60 | 1.67 | 1.67 |
| P. C. E. | 31.32 | 31.32 | 31.32 | 31.32 |
| Load test (A) | F-2630 | F-2690 | 0.0% | 0.0% |
| Reheat | S-0.07% | E-0.25% | S-0.04% | S-0.01% |
| Mod. of rupture | 450# | 630# | 1380# | 1100# |

(A) *Load test*

25# sq. in.—maximum temperature 2730° F. held 1½ hrs.
Batches 3–4 showed no distortion at top temperature in 1½ hrs.
Batch 1—started to distort at 2630° F.
Batch 2—containing silicized $BaO.Al_2O_3$—did not distort until 2690° F.

(B) *Reheat*

Batch 1 showed slight shrinkage.
Batch 2 (silicized) showed expansion.
Batches 3–4 both showed slight shrinkage.

Spalling tests have shown that silica refractories bonded with lime and Colosil are superior to those bonded with lime alone with respect to spalling resistance. It has been found that if these brick are heated up to 1470° F., employing varying time intervals for the heating-up period, the more rapid the rate of heating the greater the percentage of brick which will crack during the heating-up and cooling periods. Batch 1 brick (containing no Colosil) all cracked when heated to 1470° F. when employing 90 minutes, 100 minutes, and 110 minutes for the heating-up intervals, while Batch 3 brick showed much less tendency to crack during comparative treatment of the latter, and Employing the 90 min. interval—80% cracked
Employing the 100 min. interval—60% cracked
Employing the 110 min. interval—40% cracked From this table it will be noticed that all properties are approximately equal, except the strength, which is greatly improved in Batch 3, which it will be noticed has a modulus of rupture as high as 1380 pounds. It was also found that when the refractories containing the silicized material were placed into service under conditions involving periods of intermittent heating close to or even above their fusion point there was much less dripping loss and deterioration by reason of less flux. In the case of the silicized barium aluminate there was an increase in strength, but there were also other important considerations which are not so apparent merely by inspection of the table.

The workmen who prepared these commercial-size batches 1 and 2, containing ordinary barium aluminate and silicized barium aluminate, said that Batch 1 was somewhat difficult to handle, as it had definite thixotropic properties, becoming more fluid when worked, so that the brick showed a tendency to slump under their own weight. After these brick had been dried, it was found that some of the dried barium aluminate had migrated to the drying surfaces. In contrast thereto, Batch 2, containing silicized barium aluminate, readily formed a firm nonslumping brick, drying with no or very slight evidence of migration of the barium aluminate.

Ware set in the bottom of the kiln for firing, where it has to support a considerable load during the burning, showed slight distortion in Batch 1 but none in Batch 2. This reaction is a very important manufacturing improvement.

The batches containing lime and silicized lime behaved normally during the entire processing procedure.

The foregoing table therefore shows the influence of silicafication on chemicals known to react with silica in batches containing essentially nothing but silica. The sodium content, introduced with the Colosil, was so slight that its consideration may be neglected. Any appreciable addition of sodium would have reflected itself by decreasing the load bearing value and the pyrometric cone equivalent. The effect of the Colosil addition therefore is just the opposite. Microscopic examination of the fired pieces offered still further evidence that the silicized chemicals produced a different reaction. Concerning the fired mixtures, a competent petrographer stated:

"The microscopic examination of these mixtures has in general indicated several pertinent facts. The brick containing lime appear to be better mixed and have in general a higher degree of homogenity across the entire slide disregarding the conversion of quartz or the presence of a flux. Batch 3 shows the residual quartz to be present in the smallest discrete units and to be well distributed.

"Batch 2 shows the greatest tendency toward loss of original grain boundaries and as compared with Batch 1 shows that the application of Colosil has helped materially from the standpoint of mixing and resultant homogenity."

EXAMPLE 2

FIRE CLAY REFRACTORIES

The method of using sodium aluminate as a bonding agent for high-grade fire clay refractories has already been described in the prior art—for example in my earlier Patents Nos. 2,019,618; 2,019,619 and 2,102,327, in which I am a joint inventor—and is operating as a successful process. I have found, however, that this sodium aluminate process is not universally applicable. The true reason for this I have never been able to determine, and I believe that the variations in results are probably attributable to the physical nature of the clays derived from different locations. I have discovered that if I silicize the sodium aluminate or use it conjointly with the Colosil, I can make this process applicable to advantage even to those clays which have not responded to the sodium aluminate treatment. These silicized forms of sodium aluminate, namely, the compounds formed by reacting sodium aluminate with Colosil, are not to be confused with the zeolite type of compounds which are formed by the double precipitation of an alkali silicate such as sodium silicate with sodium aluminate. In fact, the Colosil, when added to a sodium aluminate solution, does not produce a gel or any product having the characteristics of the products produced by mixing an alkali silicate with an alkali aluminate. The silicized aluminates, however, are much more refractory materials which in themselves will not fuse at the temperatures which they encounter in the firing processes to which the ceramic products are subjected during their manufacture. In other words, it appears that the silicized aluminate compounds must take up some other ceramic constituent from the body of the ceramic material, combining therewith by fusion and thereby producing a fired bond. It is known that sodium aluminate by itself is a very refractory material (cone 38–40), but it is usually activated because it is always used in the wet form, thereby liberating sufficient sodium hydroxide to initiate some attack on the siliceous constituent of the ceramic body and thereby initiating fusion of newly formed lower melting products. The ability of these initial fusions to take alumina into combination probably largely determines whether or not the aluminate addition is going to function as desired. If these fusions take alumina into combination and reprecipitate it as mullite in the bonding glass or at grain boundaries then it may be presumed that the ultimate body will be stable with respect to volume changes on reheating in service and that its spalling resistance will be high. If the alumina content of the aluminate does not go into combination but remains as an inert dispersed alumina hydrate residue, it is quite likely that the addition will have no effect on reheat volume stability or spalling characteristics.

This leads to the most important distinction between silicized aluminate and any other known type of alumina-silica mixture. Sodium aluminate may be heated with silica or a clay and a glass developed showing no evidence of mullite. Silicized aluminate used to develop a glass through heating a batch of identical composition will develop mullite. In the most simple terms, "silicized aluminate" is a compound extremely activated with respect to ability to bring about a fusion combination of alumina with silica during heat treatment.

As examples of utilizing these silicized aluminates, I prepared two different types containing different ratios of sodium aluminate to Colosil, which I have designated "SSA-1" and "SSA-2," meaning "silicized sodium aluminate" No. 1 and No. 2. SSA-1 was formed by mixing 205 grams of sodium aluminate (80% $Na_2O.Al_2O_3$ and 20% $H_2O$) and 250 grams of Colosil (6% $SiO_2$). The approximate molal composition thus produced would be $4Na_2O.4Al_2O_3.SiO_2$. This SSA-1 forms a clear liquid which when spread out will dry in a thin film without shrinkage. It has high adhesive strength when dry and may be dried and fired without encountering any decrease in adhesive strength. Nonplastic ceramic materials may be bonded with this material and subjected to any heat treatment below the fusion point of the nonplastics themselves without danger of loss in strength during the dehydration stage, and refractories thus bonded need not even be prefired before being placed into service.

Having prepared the SSA-1, I then prepared the following batch: 95% by weight of calcined clay and 5% by weight of SSA-1. This mixture was shaped and dried, and when fired it would not fuse even though fired to cone 35, although mullite development was noticed at as low as cone 15. This mixture has great penetrating ability and may be used, for example, for impregnation of prefired fire clay refractories as a hardening agent and to prevent their warping and cracking when in service. When such impregnated refractories are fired in service, impregnation with the SSA-1 produces a high degree of mullite formation, and this crystallization acts as a stiffening and bonding medium to increase the load bearing ability and to prevent cracking. The SSA-1 mixture may also be employed as an impregnating material for refractories which are bonded with calcium aluminate cements. It is well known that such cement bonded mixtures (without the Colosil) will normally soften and tend to disintegrate at about 1500° F., so that their satisfactory use is limited to services not exceeding this temperature. However, if these refractories are manufactured with SSA-1, their strength even in the 1500° range is maintained by the rigidity of the impregnation at a level which is only slightly under cold-set strength.

Consideration of the properties of this SSA-1 material should serve to illustrate that this form of silicized sodium aluminate is in no way similar to any form of sodium aluminate of earlier days.

More intense silicafication of sodium aluminate by the use of larger quantities of Colosil produces materials of a lower solids content which become somewhat more viscous in character as the colloidal silica content is increased. By reason of their lower solids content, however, their adhesive characteristics decrease as the silicafication treatment increases. As an example of such a higher silica compound, I may mention SSA-2, formed by mixing 205 grams of sodium aluminate and 1000 grams Colosil. This material will fuse at cone 18, and the fusion will show clear mullite development. It is more viscous than the SS-1 and does not have its penetrating ability.

In fire clay refractories the matter of determining the most suitable silicized compound to be used and the best quantity of addition is a problem which must be solved by empirical experimentation. The following is an example which will serve to illustrate a suitable method of such investigation and also will serve to illustrate the comparable results obtained with the silicized aluminate on the one hand and normal or ordinary sodium aluminate on the other hand:

*Materials*

Kentucky flint fire clay
Pyrometric cone equivalent—34
Sodium aluminate—normal
SSA—1—$4Na_2O.4Al_2O_3SiO_2$
SSA—2—$Na_2O.Al_2O_3.SiO_2$
Silicafication accomplished by Colosil in all cases.

*Procedure*

(1) Grind, temper with water and mix flint in a dry pan to desired size in combination with semi-flint clay. (P. C. E. 32–33.)
  Batch:
   95% flint—cone 34
   5% semi-flint—cone 32–33
(2) Remix in batch mixer
(3) Press to brick size on toggle press
(4) Dry and fire to cone 12.

*Improvement desired*

To eliminate the normal 2.5% to 3% shrinkage which is encountered when such brick are reheated to 1600° C. in standard reheat test. Reduction of this shrinkage to under 1.0% will place these brick in super-duty classification.

*Chemical additions made (in the initial wet-pan grinding)*

1. No chemical added
2. 0.5% sodium aluminate
3. 0.5% SSA–1—$4Na_2O.4Al_2O_3.SiO_2$
4. 0.75% SSA–1—$4Na_2O.4Al_2O_3.SiO_2$
5. 0.50% SSA–2—$Na_2O.Al_2O_3.SiO_2$
6. 0.75% SSA–2—$Na_2O.Al_2O_3.SiO_2$
SSA–1:
  $Na_2O.Al_2O_3$—91.6%
  $SiO_2$—8.4%
SSA–2:
  $Na_2O.Al_2O_3$—73.3%
  $SiO_2$—26.7%

*Reheat values—1600° C.*

| | |
|---|---|
| 1 | per cent 2.4 |
| 2 | do 2.4 |
| 3 | do 0.9 |
| 4 | do 0.9 |
| 5 | do 0.7 |
| 6 | do 0.4 |

No. 6 was selected for commercial production. Following are complete physical specifications obtained compared with normal and sodium aluminate brick:

|  | 0.75 SSA-2 | Normal | Aluminate |
|---|---|---|---|
| P. C. E | 33-34 | 33-34 | 33-34 |
| Porosity | 13.30 | 17.0 | Not tested |
| Water abs | 5.60 | 8.9 | 8.6 |
| Spalling | 0.50 | 0.50 | Not tested |
| Reheat shr | 0.40 | 2.40 | 2.40 |
| M. of R. | 695# sq. in. | 520# | 490# |
| Wt. 9" equiv | 8.4# | 8# | 8# |

The increased weight of these refractories is attributed to the lubricating action of the viscous silicized aluminate. It does not influence inherent reheat characteristics.

The above data should serve to illustrate clearly the influence of Colosil silicafication on the sodium aluminate reaction. Mix No. 5 contains less aluminate than mix No. 2 and mix No. 6 approximately the same quantity.

EXAMPLE 3

While the foregoing constitute the more important examples of the use of silicized materials in connection with refractories, I have also found that silicized products are useful in other connections. Thus, for example, silicized precipitated calcium carbonate possesses very valuable and peculiar properties which make it particularly applicable to paper coating or as a filler in oil paints. It could hardly have been expected that a colloidal silica solution would react with ordinary calcium carbonate, as it is known that diluted sodium silicate solutions definitely will not react with calcium carbonate. However, I have performed a number of experiments with Colosil-water solutions in which I have suspended and agitated precipitated chemically pure calcium carbonate for the same period of time, followed by filtration of the material on a suction filter so as to remove all free liquid. The filtrate analysis and the filter cake were then dried to determine what took place. The following mixtures were made:

Mix 1— 50 cc. Colosil+450 cc. of water ($H_2O$)+100 gms. $CaCO_3$
Mix 2—100 cc. Colosil+400 cc. of water ($H_2O$)+100 gms. $CaCO_3$
Mix 3—150 cc. Colosil+350 cc. of water ($H_2O$)+100 gms. $CaCO_3$
Mix 4—500 cc. Colosil+No cc. of water ($H_2O$)+100 gms. $CaCO_3$
Mix 5—No cc. Colosil+500 cc. of water ($H_2O$)+100 gms. $CaCO_3$ The liquid portion of the above mixes contained the following solids per cc.—

Mix 1 _____ gm__ .0062
Mix 2 _____ gm__ .0124
Mix 3 _____ gm__ .0186
Mix 4 _____ gm__ .0620
Mix 5 _____ None The following time was required for filtration:

Mix 1 _____ 13 min.
Mix 2 _____ 15 min.
Mix 3 _____ 24 min.
Mix 4 _____ 18 min.
Mix 5 _____ 2 min., 45 sec.

Drying of the filter cakes showed that the following amounts of liquid were not removed by filtration:

Mix 1 _____ cc__ 85
Mix 2 _____ cc__ 85
Mix 3 _____ cc__ 66
Mix 4 _____ cc__ 78
Mix 5 _____ cc__ 88

Volume of filtrates and solids content per cc. (obtained by evaporation):

Mix 1—415 cc. filtered off, containing .0035 gms. solids per cc.
Mix 2—415 cc. filtered off, containing .0090 gms. solids per cc.
Mix 3—434 cc. filtered off, containing .0145 gms. solids per cc.
Mix 4—412 cc. filtered off, containing .0558 gms. solids per cc.
Mix 5—392 cc. filtered off, containing no solids The following shows the solids content of the original liquids compared with that of the liquids after reaction with the carbonate:

|  | Original | After reaction | Solids reacted |
|---|---|---|---|
|  | Gms. per cc. |  | Per cent |
| Mix 1 | .0062 | .0035 | 43.5 |
| Mix 2 | .0124 | .0090 | 27.3 |
| Mix 3 | .0186 | .0145 | 22.0 |
| Mix 4 | .0620 | .0558 | 10.0 |

The calcium carbonate masses resulting from mixes 1, 2, 3 and 4 filtered to compact, coherent masses, while mix 5 remained mushy. After drying, the masses resulting from mixes 1 to 4 exhibited brittleness and strength, which was missing in mix 5. A sodium silicate solution having a ratio of 1/3.25, diluted so as to obtain the same silica molality as the Colosil, exhibited no evidence whatever of combining with the calcium carbonate.

The calcium carbonate thus made may be dried and ground and is a far more effective filler or coating material for paper than ordinary calcium carbonate. It may, of course, also be combined with various ceramic materials if desired.

EXAMPLE 4

I have also found that the Colosil can be combined with solutions of magnesium sulfate, causing them to set up into a homogeneous full-bodied gel with no uncombined liquid. If, on the other hand, magnesium sulfate is mixed with dilute sodium silicate solution, precipitation of magnesium silicate takes place with a lot of supernatant liquid. Such a mixture of magnesium sulfate with Colosil may be employed as a bonding agent for talc or steatite, forming therewith plastic mixtures which may be extruded, shaped, dried, and fired.

EXAMPLE 5

Another ceramic bonding material which I have found very advantageous consists of 200 parts of sodium aluminate and 253 parts of Colosil solution containing 6% of $SiO_2$. The mixture is a clear liquid and may be used as indicated hereinabove in connection with Examples 2 and 3.

EXAMPLE 6

The Colosil may also be employed, as already indicated, as a valuable addition to hydraulic cements, producing therein a much more uniform gelation, which increases the water retention of the cement. For example, if 15 parts of Portland cement or the like are mixed with 85 parts of limestone or similar aggregate, the addition of Colosil to the tempering water will effect a gelation of the cement which is beneficial from two standpoints: (1) this gelled-cement water mix will adhere to and cover the aggregate more uniformly and (2) its gelatinous character will result in the better packing of the aggregate. It is well known that mixtures of cement and aggregate are often flowed or poured into place; and if water alone is used as the tempering medium, the amount of water required to produce adequate flow is sufficient to wash the cement from the aggregate and to cause it to concentrate at the bottom of the mold. If, on the other hand, 25% of the normally required tempering water is replaced by a Colosil solution, the tempering addition may be increased from 20 to 30% without causing free water or washing of the aggregate; and if Colosil alone is used in admixture with the cement, the tempering liquid may be increased by as much as 100%. These additions of Colosil do, however, not adversely influence the working properties, the setting time, or the ultimate properties of the cement. Contrasted therewith, it is well known that sodium silicate solutions cause extremely rapid setting of cement, while Colosil does not affect the time of set.

It will be evident from the above that the use of the colloidal silica solution or Colosil is accompanied by many beneficial results, and the invention is to be construed as being in the broad field involving any of the ceramic cements, by which I mean either materials which set by themselves—such as Portland cement, Roman cement, etc.—or materials such as clay, fire clay, siliceous refractories, magnesium refractories, aluminum refractories, talc or steatite refractories, etc. Thus, the Colosil may be used as a bonding agent for aluminum oxide particles, either alone or in conjunction with sodium aluminate, about in the manner described in connection with Example 2, which deals with ganister or similar siliceous refractories.

In the hereunto appended claims, in order to avoid the use of any coined words, I am describing the Colosil in the following language:

A substantially stable colloidal solution of silica, said solution being comparatively free from alkali-metal ions and electrolytes and having an $SiO_2$ to $Na_2O$ ratio of at least 10:1. But I do not wish to be limited to this exact ratio, as the Colosil may have an $SiO_2$ to $Na_2O$ ratio of as high as 50:1.

The concentration of the Colosil may be varied from 2% to 15% of total solids. The material I have particularly in mind is that described and claimed in the application of Paul G. Bird, Serial No. 329,729, now U. S. Patent No. 2,244,325.

Saving for myself such modifications as occur to those skilled in the art of ceramics and cements, I claim:

1. Process of improving the physical properties of ceramic cements which comprises incorporating therewith during some stage of their manufacture before final hardening a substantially stable colloidal solution of silica, said solution being comparatively free from alkali-metal ions and electrolytes and having an $SiO_2$ to $Na_2O$ ratio of at least 10:1.

2. Process of improving the physical properties of refractory ceramic materials which comprises incorporating therewith during some stage of their manufacture before final hardening a substantially stable colloidal solution of silica, said solution being comparatively free from alkali-metal ions and electrolytes and having an $SiO_2$ to $Na_2O$ ratio of at least 10:1.

3. Process of improving fired clay products which comprises incorporating therewith during some stage of their manufacture before final hardening a substantially stable colloidal solution of silica, said solution being comparatively free from alkali-metal ions and electrolytes and having an $SiO_2$ to $Na_2O$ ratio of at least 10:1.

4. Process of improving refractory ceramic materials which comprises mixing a highly siliceous granular raw material with barium aluminate and a substantially stable colloidal solution of silica, forming into shapes, and firing the latter.

5. Process of improving refractory ceramic materials which comprises mixing a highly siliceous granular raw material with calcium hydroxide and a substantially stable colloidal solution of silica, forming into shapes, and firing the latter.

6. Process of improving fire clay refractories which comprises incorporating therewith a composition comprising sodium aluminate and a substantially stable colloidal solution of silica, forming into shapes, and firing the latter.

7. Process of improving ceramic articles which comprises incorporating therewith a calcium compound silicized by combination with a substantially stable colloidal solution of silica.

8. Process of improving ceramic articles which comprises incorporating therewith a magnesium compound silicized by combination with a substantially stable colloidal solution of silica.

9. Process of improving cements which comprises incorporating therewith a substantially stable colloidal solution of silica.

10. Cement containing a small quantity of a substantially stable colloidal solution of silica.

11. Process of casting cement articles which comprises admixing a setting cement with water and a small quantity of a substantially stable colloidal solution of silica, and forming the resulting mixture into shape and permitting it to set.

12. Process of plasticizing talc bodies which comprises forming a cementitious binder by reacting magnesium sulfate with a colloidal solution of silica, mixing the resulting product with talc and molding and firing the mixture.

13. Process of improving fire clay refractories which comprises incorporating therewith sodium aluminate silicized by reaction with an aqueous colloidal solution of silica, forming into shapes, and firing the latter.

WILLARD K. CARTER.